United States Patent [19]

Lew

[11] Patent Number: 5,074,148

[45] Date of Patent: Dec. 24, 1991

[54] RESONANCE FREQUENCY LIQUID LEVEL SENSOR

[76] Inventor: Hyok S. Lew, 7890 Oak St., Arvada, Colo. 80005

[21] Appl. No.: 497,905

[22] Filed: Mar. 23, 1990

Related U.S. Application Data

[63] Continuation-in-part of Ser. No. 461,233, Jan. 5, 1990, and Ser. No. 477,489, Feb. 9, 1990.

[51] Int. Cl.$^5$ .......................... G01F 23/22; G01N 9/24
[52] U.S. Cl. .................................. 73/290 V; 73/32 A
[58] Field of Search ........................... 73/290 V, 32 A; 340/621

[56] References Cited

U.S. PATENT DOCUMENTS 4,429,564 2/1984 Ikeda et al. .......................... 73/32 A

FOREIGN PATENT DOCUMENTS 1042251 10/1958 Fed. Rep. of Germany ... 73/290 V
2509045 1/1983 France ................................ 73/290 V

OTHER PUBLICATIONS

Taranenko, Yu. K.; "Vibrational Level Gauge with Temperature-Error Compensation", *Izmeritel'naya Tekhnika*, No. 1, pp. 51–53, (Translation) Jan. 1982.
Langdon, R. M.; "Vibratory Process Control Transducers", *The Marconi Review*, Third Quarter 1980, vol. 43, No. 218, pp. 154–175.

*Primary Examiner*—William A. Cuchlinski, Jr.
*Assistant Examiner*—W. Morris Worth

[57] ABSTRACT

A liquid level sensor comprises an elongated tubular member with two open ends contained in an elongated cylindrical container vessel in an arrangement wherein the two extremities of the elongated tubular member extending through the wall of the elongated cylindrical container vessel are respectively open to a liquid medium that rises through the elongated tubular member to the same level as the free surface thereof and to an ambient air above the free surface of the liquid medium; wherein the level of the liquid medium is determined from a natural frequency of flexural vibration of a section of the elongated tubular member partially filled with the liquid medium; which combination may further include another section of the elongated tubular member completely filled with the liquid medium, wherein the density of the liquid medium is determined from a natural frequency of flexural vibration of the section completely filled with the liquid medium and the level of the liquid medium is determined from a combination of the density of the liquid medium and the natural frequency of flexural vibration of the section of the elongated tubular member partially filled with the liquid medium.

20 Claims, 1 Drawing Sheet

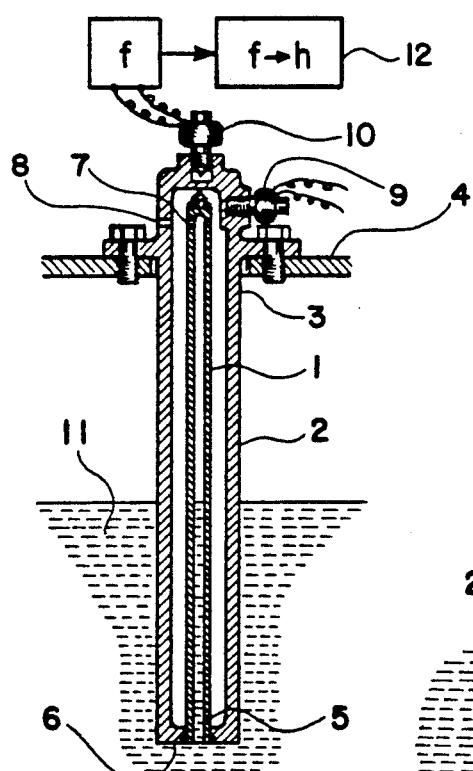
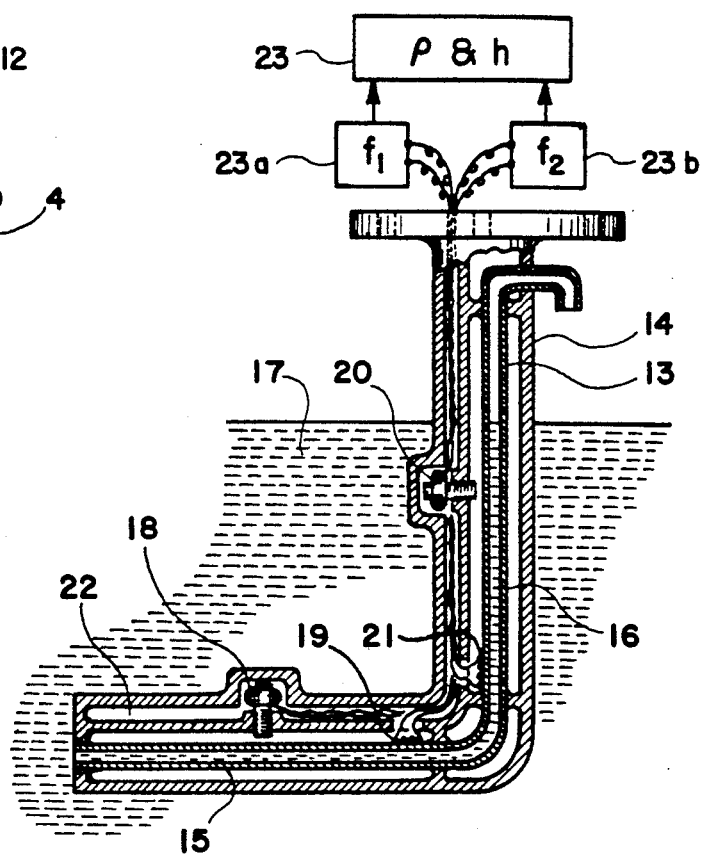
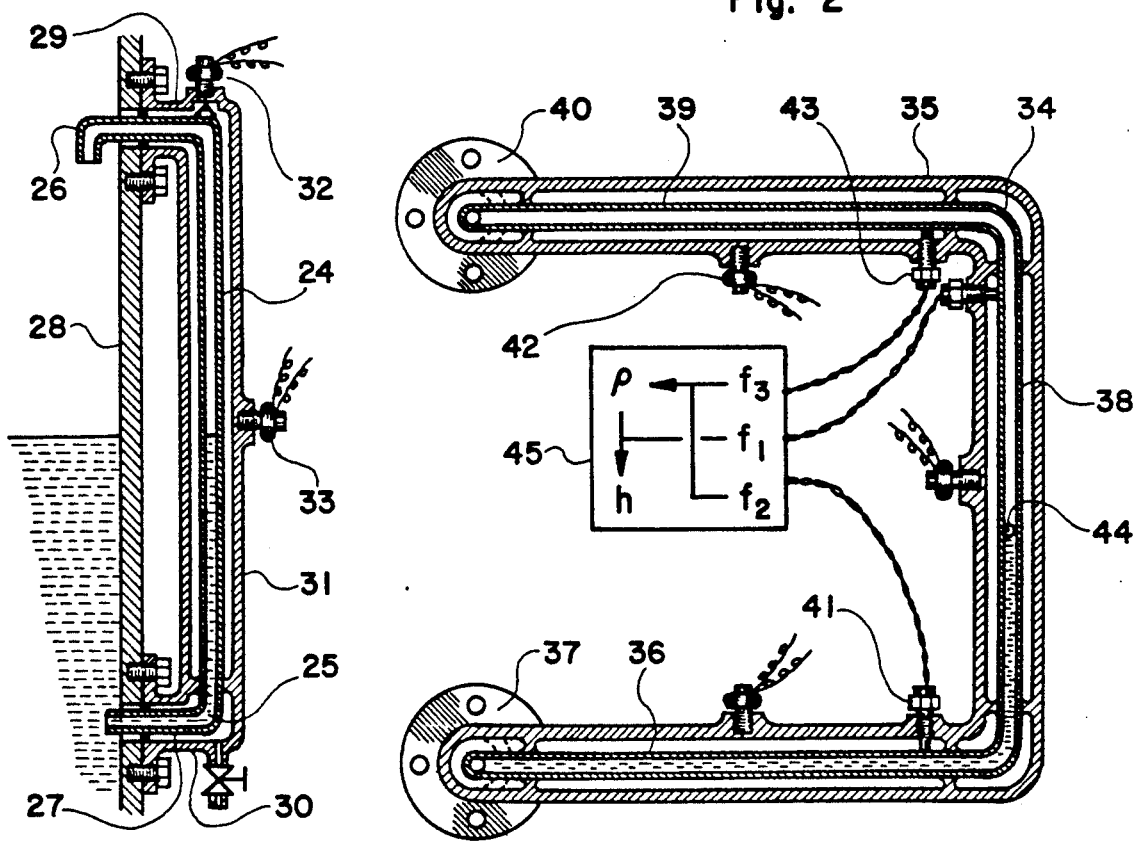
Fig. 1
Fig. 2
Fig. 3
Fig. 4

RESONANCE FREQUENCY LIQUID LEVEL SENSOR

BACKGROUND OF THE INVENTION

This is a continuation-in-part application to Ser. No. 461,233 entitled "Differential Pressure Sensor with Read-Out Device" filed on Jan. 5, 1990 and Ser. No. 477,489 entitled "Resonance Frequency Liquid Level Sensor" filed on Feb. 9, 1990.

The trend in today's instrumentation technology has been the ever increasing use of digital data processing technologies. There has been a great demand for a digital liquid level sensor that is simple in operating principles, inexpensive in cost and accurate in performance.

BRIEF SUMMARY OF THE INVENTION

The primary object of the present invention is to provide a digital liquid level sensor comprising an elongated tubular member with two open ends having at least one extremity secured to a support and partially immersed into a liquid pool, whereby the elongated tubular member is partially filled with the liquid to the same level as the level of the liquid pool; wherein the level of liquid pool is determined from a natural frequency of the flexural vibration of the elongated tubular member.

Another object is to provide a digital liquid level sensor comprising a first leg of an elongated tubular member with two open ends, which first leg with at least one extremity secured to a support is fully submerged in a liquid pool, and a second leg with at least one extremity secured to a support partially immersed into the liquid pool and filled with the liquid to the same level as the level of the liquid pool; wherein the density of the liquid is determined from the natural frequency of flexural vibration of the first leg of the elongated tubular member, and the level of the liquid pool is determined from a combination of the liquid density and the natural frequency of flexural vibration of the second leg of the elongated tubular member.

A further object is to provide a digital liquid level sensor comprising an elongated tubular member with two open ends, that includes a first leg with at least one extremity secured to a support fully submerged in a liquid pool; a second leg with at least one extremity secured to a support partially immersed into the liquid pool and filled with the liquid to the same level as the level of the liquid pool; and a third leg with at least one extremity secured to a support disposed fully above the level of the liquid pool; wherein the density of the liquid is determined from a combination of natural frequencies of flexural vibrations of the first and third legs, and the liquid level is determined from a combination of the liquid density and natural frequencies of flexural vibrations of the second and third legs of the elongated tubular member.

These and other objects of the present invention will become clear as the description thereof progresses.

BRIEF DESCRIPTION OF THE FIGURES

The present invention may be described with a greater clarity and specificity by referring to the following figures:

FIG. 1 illustrates a cross section of an embodiment of the digital level sensor of the present invention, that comprises a single vibrating section of an elongated tubular member.

FIG. 2 illustrates a cross section of an embodiment of the digital level sensor that comprises two vibrating sections of an elongated tubular member.

FIG. 3 illustrates a cross section of another embodiment of the digital level sensor including a single vibrating section of an elongated tubular member.

FIG. 4 illustrates a cross section of an embodiment of the digital level sensor including three vibrating sections of an elongated tubular member.

DESCRIPTION OF THE ILLUSTRATED EMBODIMENTS

In FIG. 1 there is illustrated a cross section of an embodiment of the digital level sensor, that includes an elongated tubular member 1 with two open ends coaxially disposed within a rigid elongated cylindrical container 2 with at least one extremity 3 secured to a supporting structure 4. At least the lower extremity 5 of the elongated tubular member 1 extending through the closed bottom 6 of the rigid elongated cylindrical container 2 in a leak proof arrangement is secured to the rigid elongated cylindrical container 2. The upper extremities of the elongated tubular member 1 and the rigid elongated cylindrical container 2 have vent holes 7 and 8, respectively. The electromagnetic vibrator 9 secured to the rigid elongated cylindrical container 2 generates flexural vibration of the elongated tubular member at a natural frequency thereof. The vibratory motion detector 10 such as a motion sensor of magnetic induction type provides a fluctuating electrical signal representing the flexural vibration of the elongated tubular member 1, from which the natural frequency of the flexural vibration is determined. A frequency counter or frequency counting circuit 12a connected to the motion detector 10 measures the frequency of the alternating electrical signal representing the flexural vibration of the elongated tubular member 1, and supplies the measured value of the frequency to the data processor 12. It is evident that the liquid fills the elongated tubular member 1 to the same level as the level of the liquid pool 11.

The natural frequency f of the flexural vibration of the elongated tubular member 1 is related to the masses under vibration by the following equation:

$$EIf^2 = F_1(m) + F_2(\rho h), \tag{1}$$

where E is the modulus of elasticity of material making up the elongated tubular member, I is the moment of inertia of the cross section of the elongated tubular member, $F_1$ and $F_2$ stand for mathematical relationships, m is the linear density of the elongated tubular member, $\rho$ is the density of the fluid, and h is the height of the liquid column in the elongated tubular member measured from the section of securing thereof to the rigid elongated cylindrical container. For small amplitude flexural vibration, equation (1) can be approximated by the equation $$EIf^2 = Am + B\rho h, \tag{2}$$

where A and B are coefficients of proportionality. Equation (2) provides the following equation for the liquid level H measured from the bottom of the liquid pool:

$$H = \frac{1}{B\rho} (EIf^2 - Am) + h_0, \quad (3)$$

where $h_0$ is the vertical distance from the bottom of the liquid pool to the section of securing where the elongated tubular member 1 is secured to the rigid elongated cylindrical member 2. When the liquid density $\rho$ is a known constant, the digital liquid level sensor shown in FIG. 1 determines the liquid level per equation (3) by using the known value of the liquid density $\rho$ substituted thereinto. It is generally recommended to obtain equations (1) or (2) by an empirical method and then solve it for the liquid level. The computer or data processor 12 calculates H from equation (3) by using stored values of $\rho$ and $h_0$, and measured value of the natural frequency f. It should be mentioned that the upper extremity of the elongated tubular member 1 may be secured to the rigid elongated cylindrical container and the electromagnetic vibrator 9 and the vibration sensor 10 are relocated to a midsection of the combination.

In FIG. 2 there is illustrated a cross section of the digital level sensor comprising an angled elongated tubular member 13 with two open ends disposed coaxially within a rigid angled cylindrical container 14. The elongated tubular member 13 has a first section 15 with two fixed ends completely filled with the liquid as the first section 15 disposed in a generally horizontal position is fully submerged in the liquid, and a second section 16 with two fixed ends filled with the liquid to the same level as the level of the liquid pool 17 as the second section 16 disposed in a generally vertical position is partially immersed in the liquid pool 17. The first section 15 of the elongated tubular member includes an electromagnetic vibrator 18 and a vibration sensor 19 of strain gauge type, while the second section 16 includes an electromagnetic vibrator 20 and a vibration sensor 21 of strain gauge type. The lead wires extending from the electromagnetic vibrators and the vibration sensors are routed through a sealed conduit 22 disposed parallel and secured to the elongated rigid cylindrical container 14. It should be noticed that the space between the elongated tubular member 13 and the wall of the rigid elongated cylindrical container 14 is sealed off from the liquid as well as from the ambient air.

Application of equation (2) to the first section 15 of the elongated tubular member 13 yields the equation:

$$\rho = \frac{1}{B_1 L} (EIf_1^2 - A_1 m), \quad (4)$$

where the subscript 1 stands for the first section 15 and L is the distance between the two fixed ends of the first section 15. Equation (2) applied to the second section 16 takes the form:

$$EIf_2^2 = A_2 m + B_2 \rho h, \quad (5)$$

where the subscript 2 stands for the second section 16. The following equation for the liquid level equivalent to equation (3) is obtained from a combination of equations (4) and (5):

$$H = \frac{B_1 L}{B_2} \frac{EIf_2^2 - A_2 m}{EIf_1^2 - A_1 m} + h_0. \quad (6)$$

It is clear from equation (6) that the digital level sensor shown in FIG. 2 determines the liquid level independent of the liquid density. The calculation of equation (6) is carried out by a computer or data processor 23 by using the measured value of natural frequencies $f_1$ and $f_2$ of the two sections of the elongated tubular member 13 respectively measured by the frequency counters or frequency counting circuits 23a and 23b connected to the motion sensors 19 and 21, respectively. The computer or data processor 23 may also provide the value of the liquid density obtained from equation (4). It is interesting to notice that the elimination of the first section 15 and accessories thereof provides an embodiment of the digital level sensor comprising a single vibrating section of the elongated tubular member such as that shown in FIG. 1.

In FIG. 3 there is illustrated a cross section of another embodiment of the digital level sensor operating on the same principles as those described in conjunction with FIG. 1. The two extremities of the vibrating section 24 of the elongated tubular member 25 have angled extensions 26 and 27 extending through the tank wall 28 and into the interior of the liquid tank, while the angled extensions 29 and 30 respectively extending from the two extremities of the rigid cylindrical container 31 housing the elongated tubular member 25 include securing means such as the flanges welded or bolted to the tank wall 28. Both extremities of the vibrating section 24 of the elongated tubular member 25 may be secured to the rigid cylindrical container 31 as exemplified by the second section 16 of the elongated tubular member 13 shown in FIG. 2. In such a modified embodiment, the vibration detector 32 has to be relocated to a position intermediate the two secured extremities of the vibrating section 24. The location of the electromagnetic vibrator 33 is suitable for the vibrating section 24 with one end fixed or both ends fixed.

In FIG. 4 there is illustrated a cross section of an embodiment of the digital level sensor comprising a combination of the elongated tubular member 34 with two open ends and the elongated rigid cylindrical container 35, which combination has a generally horizontal first section 36 with one extremity affixed to the wall of a liquid tank by means of the flange 37, a generally vertical second section 38, and a generally horizontal third section 39 with one extremity affixed to the tank wall by means of the flange 40, wherein each section includes a vibrating section of the elongated tubular member 34 with two fixed ends and the combination of an electromagnetic vibrator and a vibration sensor, which may be a Piezo electric type as exemplified by the sensor 41 in contact with a section of the vibrating section of the elongated tubular member adjacent to one of the two fixed ends thereof. The first section of the elongated tubular member is completely filled with the liquid, while the second section is filled to the same level as the level of the liquid in the tank. The third section is void of the liquid. Equations (4) and (5) are respectively applicable to the first and second sections of the elongated tubular member 34, while the flexural vibration of the third section of the elongated tubular member 34 satisfies the following equation:

$$EIf_3^2 = A_3 m, \quad (7)$$

where the subscript 3 stands for the third section of the elongated tubular member 34. When (EI) appearing in equation (6) is eliminated by using equation (7), equation (6) takes the form $$H = \frac{B_1 L}{B_2} \frac{A_3 f_2^2 - f_3^2}{A_3 f_1^2 - f_3^2} + h_0. \quad (8)$$

It is evident from equation (8) that the digital level sensor shown in FIG. 4 is desirable when the modulus of elasticity E changes significantly due to an extreme change of the temperature and the liquid level has to be determined accurately independent of the changing modulus of elasticity. Such an application is rather rare and it is most likely that the embodiments of the digital level sensor shown in FIGS. 1, 2 or 3 will satisfy most cases requiring the measurement of the liquid level. The computer or data processor 41 carries out the numerical calculation of equation (8) by using measured values of $f_1$, $f_2$ and $f_3$, which computer or data processor may provide the liquid density given by equation (4) wherein (EI) appearing therein is eliminated by using equation (7). The modified version of the embodiment shown in FIG. 2, that is now designed to be mounted on the wall of a liquid tank, can be readily obtained by omitting the electromagnetic vibrator 42 and the vibration sensor 43, wherein the third section 39 is merely a venting conduit section and structural support, which modified embodiment determines the liquid density from equation (4) and the liquid level from equation (6), of which calculations are carried out by the computer or data processor 23 shown in FIG. 2. It is noticed that a third section equivalent to the horizontal third section 39 included in the embodiment shown in FIG. 4 can be readily added to the embodiment shown in FIG. 2 in order to convert the embodiment shown in FIG. 2 to a digital level sensor operating on the same principles as those of the embodiment shown in FIG. 4. There may be a certain advantage to include a floating ball 44 floating at the top of the liquid column contained in the elongated tubular member, as the ball 44 with diameter slightly less than the internal diameter of the elongated tubular member wipes the wall thereof and maintains the consistancy in the characteristics of flexural vibration of the elongated tubular member.

While the principles of the present invention have now been made clear by the illustrative embodiments, there will be many modifications of the structures, arrangements, proportions, elements and materials obvious to those skilled in the art, which are particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for measuring level of liquid medium comprising in combination:
   a) an elongated tubular member with one end open to a liquid medium contained within a reservoir container and a second end opposite to said one end open to ambient surrounding within the reservoir container directly above the free surface of the liquid medium including a section partially filled with the liquid medium to a level generally identical to the free surface of the liquid medium;
   b) a rigid container vessel enclosing said section of the elongated tubular member and isolating outer cylindrical surface of the elongated tubular member from the liquid medium wherein said one end of the elongated tubular member open to the liquid medium extends through a wall of the rigid container vessel in a leak-proof manner and is exposed to the liquid medium, wherein said section of the elongated tubular member is secured to the rigid container vessel at least one extremity thereof, and the rigid container vessel is secured to a supporting structure;
   c) means for generating a flexural vibration of said section of the elongated tubular member and means for measuring natural frequency of the flexural vibration of said section of the elongated tubular member; and
   d) means for determining level of liquid medium as a function of said natural frequency of the flexural vibration.

2. The combination as set forth in claim 1 wherein said section of the elongated tubular member is secured to the rigid container vessel at both extremities thereof.

3. The combination as set forth in claim 2 wherein said second end of the elongated tubular member open to the ambient surrounding has an opening extending through the wall of the rigid container vessel and disposed directly above the free surface of the liquid medium.

4. The combination as set forth in claim 1 wherein said rigid container vessel comprises an elongated cylindrical container vessel enclosing said section of the elongated tubular member, and said elongated cylindrical container vessel including fastening means for securing the elongated cylindrical container vessel to the supporting structure, wherein said one end of the elongated tubular member open to the liquid medium extends through an end wall of the elongated cylindrical container vessel in a leak-proof arrangement and is exposed to the liquid medium.

5. The combination as set forth in claim 4 wherein said section of the elongated tubular member is secured to the rigid container vessel at both extremities thereof.

6. The combination as set forth in claim 5 wherein said end of the elongated tubular member open to the ambient surrounding extends through a side wall of the elongated cylindrical container vessel and has an opening disposed directly above the free surface of the liquid medium.

7. An apparatus for measuring level of liquid medium comprising in combination:
   a) an elongated tubular member with one end open to a liquid medium and a second end opposite to said one end open to ambient surrounding above the free surface of the liquid medium including a first section completely filled with the liquid medium and a second section partially filled with the liquid medium to a level generally identical to the free surface of the liquid medium;
   b) a rigid container vessel enclosing said first and second sections of the elongated tubular member and isolating outer cylindrical surfaces of said first and second sections of the elongated tubular member from the liquid medium wherein said one end of the elongated tubular member open to the liquid medium extends through an end wall of the rigid container vessel in a leak-proof manner and is exposed to the liquid medium, wherein said first section of the elongated tubular member is secured to the rigid container vessel at both extremities thereof, said second section of the elongated tubular member is secured to the rigid container vessel at least one extremity thereof, and the rigid container vessel is secured to a supporting structure;

c) means for generating flexural vibrations of said first and second sections of the elongated tubular member, and means for measuring natural frequencies of the flexural vibrations of said first and second sections of the elongated tubular member; and d) means for determining the level of liquid medium as a function of said natural frequencies of the flexural vibrations.

8. The combination as set forth in claim 7 wherein said combination includes means for determining density of the liquid medium from the measured natural frequency of flexural vibration of said first section of the elongated tubular member.

9. The combination as set forth in claim 7 wherein said second section of the elongated tubular member is secured to the rigid container vessel at both extremities thereof.

10. The combination as set forth in claim 9 wherein said second end of the elongated tubular member open to the ambient surrounding has an opening extending through a side wall of the rigid container vessel and disposed directly above the free surface of the liquid medium.

11. The combination as set forth in claim 9 wherein said combination includes means for determining density of the liquid medium from the measured natural frequency of flexural vibration of said first section of the elongated tubular member.

12. The combination as set forth in claim 7 wherein said rigid container vessel comprises an elongated cylindrical container vessel enclosing said first and second sections of the elongated tubular member, said elongated cylindrical container vessel including fastening means for securing the elongated cylindrical container vessel to the supporting structure, wherein said one end of the elongated tubular member open to the liquid medium extends through an end wall of the elongated cylindrical container vessel in a leak-proof arrangement and is exposed to the liquid medium.

13. The combination as set forth in claim 12 wherein said second section of the elongated tubular member is secured to the rigid container vessel at both extremities thereof.

14. The combination as set forth in claim 13 wherein said second end of the elongated tubular member open to the ambient surrounding extends through the elongated cylindrical container vessel and has an opening disposed directly above the free surface of the liquid medium.

15. The combination as set forth in claim 13 wherein said combination includes means for determining density of the liquid medium from the measured natural frequency of flexural vibration of said first section of the elongated tubular member.

16. An apparatus for measuring level of liquid medium comprising in combination:

a) an elongated tubular member with one end open to a liquid medium and a second end opposite to said one end open to ambient surrounding above the free surface of the liquid medium including a first section adjacent to said one end and completely filled with the liquid medium, a second section partially filled with the liquid medium to a level generally identical to the free surface of the liquid medium, and a third section adjacent to said second end and void of the liquid medium;

b) a rigid container vessel enclosing at least said first and second sections of the elongated tubular member and isolating outer cylindrical surfaces of at least said first and second sections of the elongated tubular member from the liquid medium wherein said one end of the elongated tubular member open to the liquid medium extends through an end wall of the rigid container vessel in a leak-proof manner and is exposed to the liquid medium, wherein said first section of the elongated tubular member is secured to the rigid container vessel at both extremities thereof, said second section of the elongated tubular member is secured to the rigid container vessel at both extremities thereof, said third section of the elongated tubular member is secured to the rigid container vessel at least one extremity thereof, and the rigid container vessel is secured to a supporting structure;

c) means for generating flexural vibrations of said first, second, and third sections of the elongated tubular member, and means for measuring natural frequencies of the flexural vibrations of said first, second, and third sections of the elongated tubular member; and d) means for determining the level of liquid medium as a function of said natural frequencies of the flexural vibrations.

17. The combination as set forth in claim 16 wherein said combination includes means for determining density of the liquid medium from a combination of the measured natural frequencies of flexural vibrations of said first and third sections of the elongated tubular member.

18. The combination as set forth in claim 16 wherein said rigid container vessel comprises an elongated cylindrical container vessel enclosing said first, second and third sections of the elongated tubular member, said elongated cylindrical container vessel including fastening means for securing the elongated cylindrical container vessel to the supporting structure, wherein said one end of the elongated tubular member open to the liquid medium extends through an end wall of the elongated cylindrical container vessel in a leak-proof arrangement and is exposed to the liquid medium.

19. The combination as set forth in claim 18 wherein said other end of the elongated tubular member open to the ambient surrounding extends through the elongated cylindrical container vessel and has an opening disposed directly above the free surface of the liquid medium.

20. The combination as set forth in claim 18 wherein said combination includes means for determining density of the liquid medium from a combination of the measured natural frequencies of flexural vibrations of said first and third sections of the elongated tubular member.

* * * * *